United States Patent [19]

Harvey et al.

[11] Patent Number: 5,199,966
[45] Date of Patent: Apr. 6, 1993

[54] OPTICAL COUPLER METHOD

[75] Inventors: George T. Harvey, Princeton, N.J.; Peter H. Read, Morrisville, Pa.

[73] Assignee: AT&T Bell Laboratories, Murray Hill, N.J.

[21] Appl. No.: 746,060

[22] Filed: Aug. 12, 1991

Related U.S. Application Data

[63] Continuation of Ser. No. 481,731, Feb. 14, 1990, abandoned, which is a continuation of Ser. No. 188,587, Apr. 29, 1988, abandoned.

[51] Int. Cl.⁵ .......................................... C03B 37/075
[52] U.S. Cl. ........................... 65/4.21; 65/3.11; 65/10.2; 385/96; 385/98; 156/158
[58] Field of Search ................. 65/4.2, 4.21, 10.2, 65/61, 3.11, 94, 97, 105, 106, 112; 51/283 R; 385/96, 98; 156/158

[56] References Cited

U.S. PATENT DOCUMENTS

| | | | |
|---|---|---|---|
| 3,498,771 | 3/1970 | Bird et al. | 65/12 |
| 3,871,935 | 3/1975 | Gloge | 156/158 |
| 3,879,182 | 4/1975 | Strack | 65/102 |
| 3,912,574 | 10/1975 | Cherin | 156/158 |
| 3,920,432 | 11/1975 | Smith | 65/4 |
| 4,015,035 | 3/1977 | Blad | 156/158 |
| 4,071,343 | 1/1978 | Siegmund | 65/102 |
| 4,165,496 | 8/1979 | Domenico, Jr. et al. | 350/96.15 |
| 4,184,859 | 1/1980 | Maklad | 65/2 |
| 4,296,995 | 10/1981 | Bickel | 350/96.15 |
| 4,410,346 | 10/1983 | Aulich et al. | 65/4.2 |
| 4,450,333 | 5/1984 | Andrejco et al. | 219/10.49 R |
| 4,622,710 | 5/1987 | Berge | 65/10.2 |
| 4,631,079 | 12/1987 | Clark et al. | 65/109 |
| 4,643,752 | 2/1987 | Howard | 65/3.15 |
| 4,755,021 | 7/1988 | Dyott | 350/96.21 |
| 4,923,540 | 5/1990 | Born | 156/158 |
| 4,950,318 | 8/1990 | Dyott | 65/102 |

FOREIGN PATENT DOCUMENTS

| | | | |
|---|---|---|---|
| 3428092 | 2/1985 | Fed. Rep. of Germany | 65/10.2 |
| 514670 | 5/1976 | U.S.S.R. | 156/158 |
| 2001952 | 2/1979 | United Kingdom | 65/4.21 |
| 2045458 | 3/1979 | United Kingdom | 65/4.21 |
| 2151040 | 7/1985 | United Kingdom | 350/96.21 |

OTHER PUBLICATIONS

"Single-mode and Multimode All-Fiber Directional Couplers for WDM," by G. Winzer, H. F. Mahlein, and A. Reichelt, *Applied Optics*, vol. 20, No. 18, p. 3128, Sep. 15, 1981.

Primary Examiner—Robert L. Lindsay
Attorney, Agent, or Firm—Bruce S. Schneider

[57] ABSTRACT

Substrates for supporting optical fibers in an optical coupler are made by, first, making grooves in a glass preform which are about ten times the desired size, and then using glass drawing techniques to draw from the preform a substrate of the proper size. Optical fibers are arranged in ribbon form and placed in a fixture which allows the ends to be cut and polished at the angle required for proper coupler operation. Fibers are stripped from the end of the ribbon that has been cut and polished and placed in the grooves for proper alignment with abutting fibers. The ends of the fibers that remain fixed to the ribbon prevent unwanted rotation of the fibers.

18 Claims, 2 Drawing Sheets

OPTICAL COUPLER METHOD

This application is a continuation of application Ser. No. 07/481,731, filed on Feb. 14, 1990, which is a continuation of Ser. No. 07/188,587, filed Apr. 29, 1988, both now abandoned.

TECHNICAL FIELD

This invention relates to optical devices and more particularly to optical couplers and methods and apparatus for making optical couplers.

BACKGROUND OF THE INVENTION

A fundamental device used in optical communication systems is the optical coupler, a device described, for example, in the U.S. Patent of Dl Domenico, et al. 4,165,496, a patent assigned to a subsidiary of the present assignee. The coupler basically comprises two end-to-end optical fibers having abutting ends that are cut at an angle and coated with a partially reflecting coating such as a multilayer dielectric or a metallic film. The angled interface between the two optical fibers then constitutes a partially reflecting surface by which a portion of the light propagating along the two fibers can be removed. The removed portion can be used for a number of purposes, such as controlling the original light source, controlling a repeater, etc. The interface can also be used to introduce light wave information onto one of the fibers.

It is apparent that the two abutted optical fibers must be in precise alignment for the coupler to work properly. Such alignment is normally assured by the use of a silicon substrate having a V groove in one surface for supporting the two abutting fiber ends. Often, a light wave system requires a plurality of couplers for a plurality of parallel fibers, which can be implemented through the use of a plurality of side-by-side V grooves in the silicon substrate. The plurality of optical fibers are then located side-by-side in the V grooves, and separate photodetectors are used to detect the partially-reflected output from each coupler.

Silicon is a good material for making the small grooves needed for fiber support and alignment because known principles of photolithographic masking and etching can be used to define the grooves. Because of the crystalline structure of silicon, one can employ anisotropic etching to form the V-shaped troughs with great precision; this is important because each fiber has a diameter of only about 125 microns.

One problem with using a silicon substrate for this purpose is that silicon has a different index of refraction from that of glass and a different coefficient of thermal expansion. The difference of thermal expansion of the glass optical fibers and the silicon substrate can cause small but harmful misalignments and can restrict the selection of adhesives. The difference of index of refraction between the silicon and the glass can cause unwanted reflections.

SUMMARY OF THE INVENTION

These and other problems of known optical couplers can be alleviated by making the substrate out of a glass preform, preferably silica, and then softening and drawing the preform to the proper size of the substrate. Support grooves are made in the glass preform which are much larger than the size of the desired grooves of the substrate. A portion of the glass preform is heated to a sufficiently high temperature to cause reflow of the glass. Then, using known optical fiber drawing techniques, the reflowed portion of the preform is drawn to a sufficiently small diameter that the grooves in the substrate are of an appropriate size for mounting optical fibers. After cooling, the drawn portion of the preform is cut and used as the substrate which has essentially the same coefficient of thermal expansion and index of refraction as the glass fibers.

Because glass is amorphous, silicon etch techniques cannot be used to make the grooves with the required precision. However, with our technique, larger grooves can be made in the preform with conventional techniques and then reduced in size to give the grooves that are required. Known techniques for drawing optical fibers and for controlling the diameters of optical fibers have been found to be appropriate for reducing the support grooves to the size desired.

In accordance with another feature of the invention, an optical fiber ribbon containing a plurality of optical fibers to be supported by the substrate is placed in a fixture for cutting and polishing simultaneously all of the optical fibers of the ribbon. The same fixture is used with the abutting ribbon, but with the ribbon rotated by 180 degrees. By using the same fixture on both ribbons, one assures that the ends of one ribbon are polished at an angle $\alpha$ and the ends of the other ribbon are polished at an angle of $180° - \alpha$. The ribbon coating is stripped from the two ends of the fiber ribbons to be mounted in the coupler, and the component optical fibers are abutted in the substrate grooves. A portion of each ribbon is left intact to maintain the relative angular orientation of each component fiber.

These and other objects, features and advantages will be better understood from the consideration of the Detailed Description taken in conjunction with the accompanying drawing.

DRAWING DESCRIPTION

DETAILED DESCRIPTION

Figure 1:
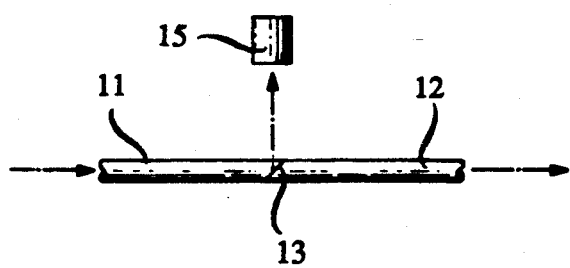
FIG. 1 is a schematic view of an optical coupler.

Referring now to FIG. 1, there is shown schematically a device referred to herein as an optical coupler, but also known as a beam splitter, a directional coupler, an optical fiber tap, a bi-directional coupler, and perhaps other terms. The optical coupler comprises two end-to-end optical fibers 11 and 12 having matched beveled ends that form an interface 13. The interface is formed by polishing one of the fibers at an angle $\alpha$ and the other at an angle $180° - \alpha$. The end of optical fiber 12, for example, is ground and polished at 45° while the matching end of fiber 11 is ground at 135°. Light propagating along optical fiber 11, as shown by the arrow, is partially reflected by interface 13 such as to remove part of the light from the fiber while transferring the remainder along optical fiber 12. A portion of the light reflected from the fiber may be detected and converted to electrical energy by a photodetector 15.

As taught, for example, in the aforementioned Di Domenico patent, it is important that fibers 11 and 12 be properly aligned; and for this purpose one may use as a supporting substrate a member of monocrystalline silicon containing V grooves on one surface.

Figure 2:
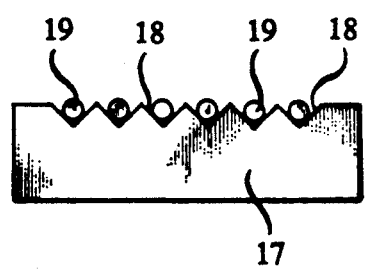
FIG. 2 is a schematic view of a support substrate for optical fibers.

In modern optical systems, a plurality of optical couplers are often required at one location, and for this purpose one may use a substate 17 into which a number of V grooves 18 have been formed as shown in FIG. 2. The V grooves may be formed with great precision by masking the surface of a silicon member and etching it along crystalline planes in accordance with known principles of anisotropic etching so as to yield V grooves of precisely predetermined geometry. An optical fiber 19 is supported in each of the V grooves 18 as shown, it being understood that each fiber 19 abuts another fiber so as to form a coupler as shown in FIG. 1.

Many benefits could be obtained by making substrate 17 out of glass rather than silicon. First, there would be a better thermal match of the substrate with the glass fibers, which would reduce the risk of misalignments due to differential thermal expansion and contraction. Further, if the substrate were made of the same material as the optical fibers, there would not be unwanted interfaces defined by an abrupt change of refractive index; this would reduce the risk of spurious reflections. Glass has a refractive index of 1.45, while silicon has a refractive index of 3.2. Unfortunately, since glass is an amorphous material, one cannot rely on anything corresponding to anisotropic etching for obtaining the required V groove configuration.

In accordance with one aspect of the invention, the substrate 17 is initially part of a glass preform having dimensions much larger than that required for the substrate; e.g., the preform dimensions may be ten times the corresponding substrate dimension. Into this glass preform a number of grooves on one surface are made by conventional techniques, and since the grooves are made much larger than that required for the final product, they are easy to make by machining or other conventional glass forming techniques; e.g., the preform grooves may be ten times larger than the corresponding substrate grooves.

Figure 3:
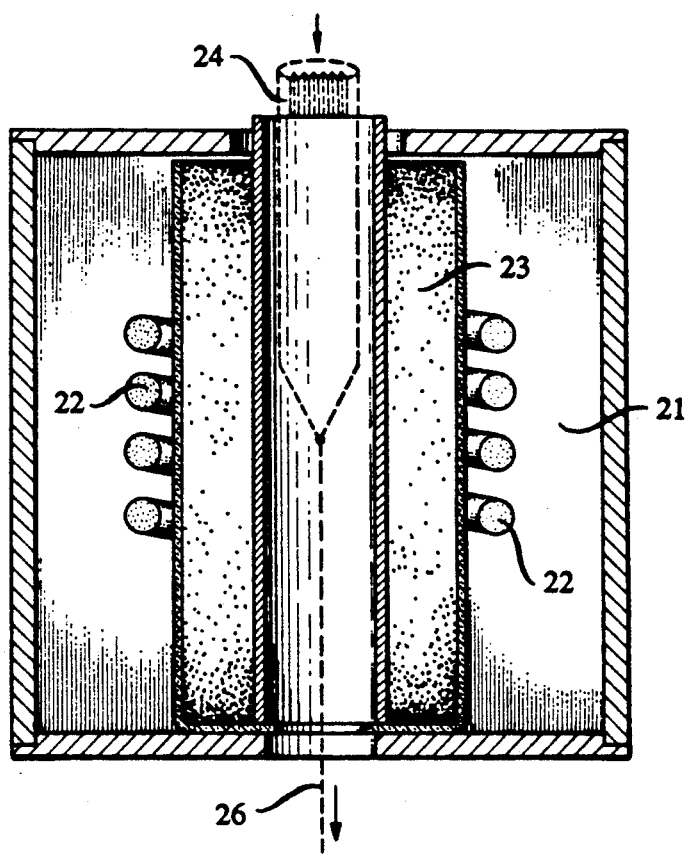
FIG. 3 is a schematic view of glass drawing apparatus that may be used in accordance with one embodiment of the invention.

The glass preform is then heated and drawn, using known glass drawing techniques, to a small diameter (e.g., one-tenth its original diameter) which reduces all of the dimensions, including that of the grooves, correspondingly. For purposes of illustration, a glass drawing furnace is shown in FIG. 3, of the type described in more detail in the U.S. Patent of Andrejco et al. U.S. Pat. No. 4,450,333, assigned to a subsidiary of the present assignee company. The furnace 21 comprises an RF induction coil 22 surrounding and heating an annular arrangement of zirconium dioxide 23. The glass preform 24 is then lowered into the furnace along the central axis so that a portion of it is in the "hot zone," which softens or "reflows" that portion of the glass preform. The lower end of the preform is engaged by a tool and is drawn outside of the furnace, as shown by dotted line 26. The softened glass that is drawn out along the central axis of the furnace is then a reduced-scale replica of the original unsoftened preform. The ambient air hardens the drawn glass which is thereafter cut from the remaining part of the preform. In accordance with the invention, this cut portion that has hardened constitutes the substrate that is used for supporting the optical fibers. The grooves on the surface of the preform maintain their relative proportionality during and after drawing, so that a drawing which is one-tenth the diameter of the original preform includes grooves having dimensions one-tenth the size of those in the original preform.

The U.S. Patents of Bird et al., U.S. Pat. Nos. 3,498,771, Clark et al., 4,631,079, and Aulich et al. 4,410,346 all describe methods for monitoring and controlling the diameter of glass drawn from a preform. Also, as is known, a laser micrometer, available commercially as the Model 1160A Lasermike TM from Systems Research Labs, Inc., Dayton, Ohio, may be used to monitor the drawn glass dimensions. In setting up procedures for production, it may be that a number of drawings may have to be made before grooves with the desired dimensions are obtained, but once the proper drawing has been made, it can be reproduced many times; and known techniques are sufficiently precise that the proper dimensions can be achieved without undue experimentation.

For use with optical fibers having diameters of 125 microns, the grooves may have a depth of 125 microns. The grooves in the initial preform may have a depth of 1250 microns. The glass used for the preform is preferably fused silica, the material from which optical fibers are made. In one embodiment made, the preform dimensions were $1.2 \times 0.4$ inches, and the substrate dimensions were $0.120 \times 0.04$ inches.

Figure 5:
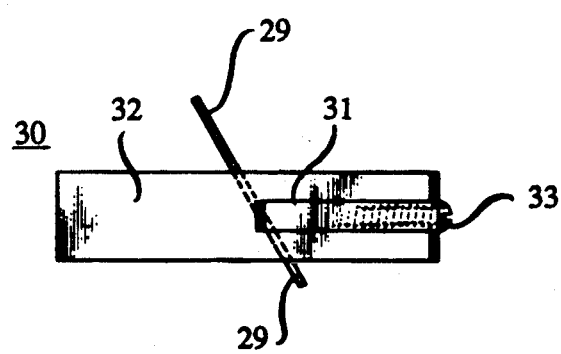
FIGS. 4 and 5 are exploded perspective and side views, respectively, of a fixture for cutting and polishing optical fiber ribbon in accordance with one embodiment of the invention.
Figure 4:
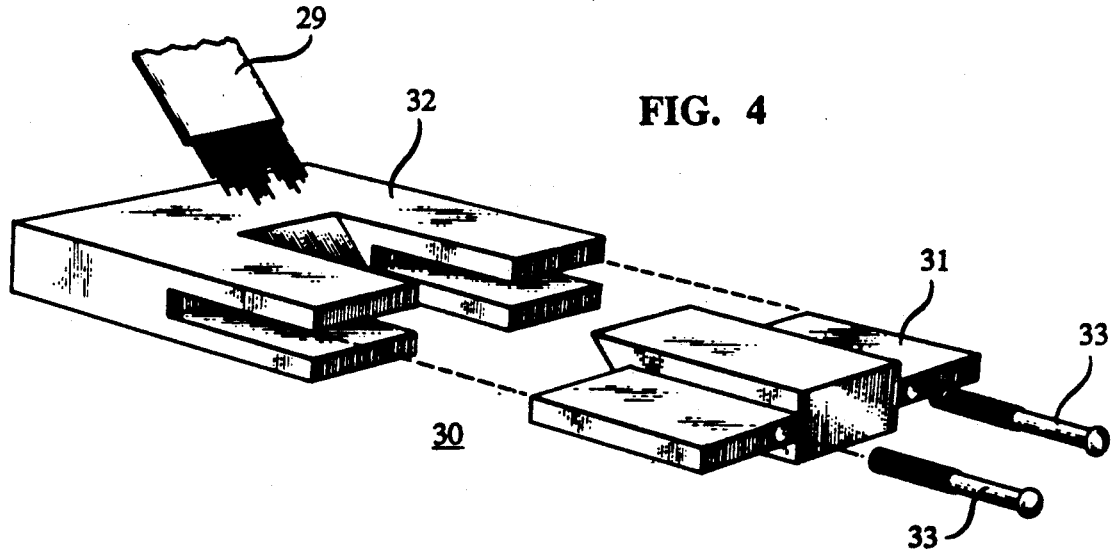

As is clear from FIG. 1, the beveled ends of the two fibers must be aligned and must match for proper operation; that is, one fiber must be beveled at an angle $\alpha$ with the other being at an angle $180° - \alpha$, and they must have the same angular orientation. Referring to FIGS. 4 and 5, the ends of component optical fibers of an optical fiber ribbon 29 are ground and polished at the proper angle through the use of a fixture 30 comprising members 31 and 32, which are joined by bolts 33 so as to fix between them the ribbon 29. Members 31 and 32 are aligned by the bolts 33 and guide slots in member 32 so as to define a common planar lower surface 35 which is at a fixed angle $\alpha$ with respect to the ribbon. With the ribbon mounted as shown, the end of the ribbon protruding from the lower surface of the fixture, as shown in FIG. 5, is ground and polished so as to be coplanar with lower surface 35 of the fixture. After polishing, all of the component fibers of ribbon 29 define an angle $\alpha$ with respect to the central axis of the ribbon.

Figure 6:
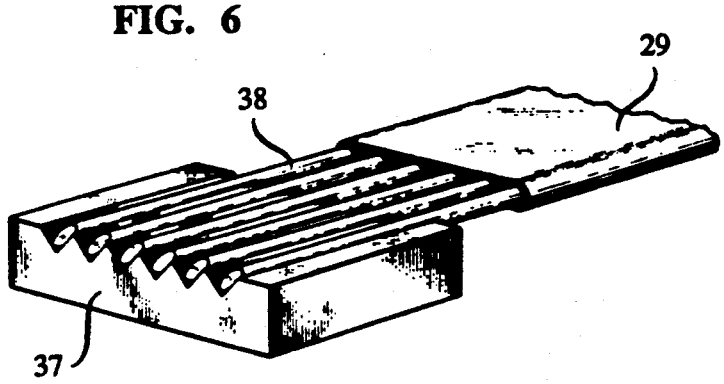
FIG. 6 is a perspective schematic view of a substrate for supporting optical fibers of an optical fiber ribbon.

The angle $180° - \alpha$ is defined in another ribbon through the use of the same fixture. With the component fibers of the two ribbons being beveled at appropriate angles, the only remaining requirement for operation as a coupler is that each fiber be maintained at its appropriate angular orientation. Referring to FIG. 6, this can conveniently be done by leaving part of the ribbon 29 intact. Thus, prior to mounting on a substrate 37, component optical fibers 38 are separated from ribbon 29, but only for a distance necessary to permit individual fiber mounting into a groove of substrate 37. By leaving the remaining portion of ribbon 29 intact, one prevents spurious relative angular displacements of the component fibers 38. Of course, for this technique to work properly, the spacing between component fibers in ribbon 29 should be substantially equal to the spacing between the grooves on the surface of substrate 37. Typical center-to-center spacing of fibers in the ribbon and of the substrate grooves is 250 microns. The ribbon holding the optical fibers is typically mylar, which can easily be stripped from the fibers to the extent desired.

Figure 7:
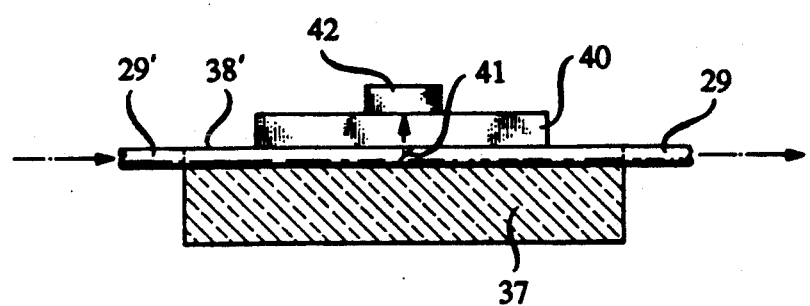
FIG. 7 is a schematic view of an optical fiber coupler made in accordance with one embodiment of the invention.

Referring to FIGS. 6 and 7, the component fibers 38, 38' of two ribbons 29 and 29' are mounted on an optical coupler including substrate 37. The ribbon 29' is mounted at 180° with respect to ribbon 29 so that, with the fibers 38 being beveled at an angle $\alpha$, the ends of fibers 38' will describe an angle 180°−$\alpha$. A glass cover 40 is included over the interface 41 of fibers 38, 38'. A separate photodetector 42 may be included for each interface 41 between each individual optical fiber 38—38'. As is known, the photodetectors may be photodiodes mounted by eutectic die-bonding. For example, gold-germanium eutectic having a melting point of 380° C. may be used. Alternatively, devices may be used for introducing light wave information onto the various optical fibers, as is known in the art. The optical fibers are preferably held in the grooves by an epoxy having a coefficient of thermal expansion and refractive index matching that of glass.

While the invention has been described for the case of an optical fiber coupler supporting a plurality of optical fibers, it is applicable to a coupler having only a single groove in the substrate for defining a single optical channel with only one interface between optical fibers as illustrated in FIG. 1. Any of various known methods may be used for making the glass drawing which defines the small groove or grooves in the substrate, and for monitoring the dimensions of the drawing. The invention is particularly suitable for use with single-mode optical fibers which require a high degree of precision in alignment and are therefore susceptible to thermal mismatches. Various embodiments and modifications of the invention other than those shown or described may be employed by those skilled in the art without departing from the spirit and scope of the invention.

What is claimed is:

1. A method for making an optical fiber device comprising the steps of:

making at least one first groove of a first size in a glass preform, the preform having first thickness and width dimensions;

heating a portion of the glass preform containing part of the first groove to a sufficiently high temperature for reflow thereof;

drawing the reflowed portion of the preform such that the drawn portion has smaller width and thickness dimensions than the first width and thickness dimensions, whereby the drawn portion contains at least one second groove having a smaller size than the first groove;

allowing the drawn portion to harden and cutting off part of the drawn portion from the preform, the cut part of the drawn portion constituting a substrate having at least one second groove and having a first index of refraction;

mounting at least one optical fiber in said one second groove of the substrate, the optical fiber having an index of refraction substantially equal to the first index of refraction;

and bonding the optical fiber to the substrate.

2. The process of the claim 1 wherein:

the glass preform has a central axis, the first groove is made so as to extend in a direction parallel to the axis, and the reflowed portion is drawn in a direction parallel to the central axis.

3. A process for making an optical fiber device comprising the steps of:

making a plurality of grooves, each of a first size, in a glass preform, the preform having first thickness and width dimensions;

heating a portion of the glass preform containing part of the plurality of grooves to a sufficiently high temperature for reflow thereof;

drawing the reflowed portion of the preform such that the drawn portion has smaller width and thickness dimensions than the first width and thickness dimensions and the grooves in the drawn portion each have a smaller size than the first size;

allowing the drawn portion to harden, and cutting part of the drawn portion from the preform;

mounting a plurality of glass fibers, each having an index of refraction substantially equal to the first index of refraction, in the plurality of grooves of the cut drawn portion, whereby the cut drawn portion constitutes a substrate for supporting the glass fibers;

and bonding the plurality of glass fibers to the substrate.

4. The process of claim 3 wherein:

the plurality of optical fibers are initially component fibers of an optical fiber ribbon wherein the optical fibers are physically connected in a side-by-side relationship;

first ends of the optical fibers are separated from the ribbon and made to be physically unconnected with first ends of other adjacent optical fibers, while second ends of the optical fibers remain physically connected to adjacent fibers and remain part of the optical fiber ribbon;

first ends of the optical fibers are each mounted in a groove of the substrate, whereby the physically connected second ends of the fibers aid in relative orientation of the unconnected first ends of the optical fibers;

and the step of mounting the optical fibers comprises the step of mounting each first end of each fiber in a separate groove.

5. The process of claim 4 wherein:

prior to separation, the first end of the optical fiber ribbon, at which the first ends of the fibers are located, is ground and polished at an angle, whereby the first ends of the fibers mounted in the grooves are all ground and polished at the same angle.

6. The process of claim 5 wherein:

the substrate grooves are used to align the ground and the polished ends of the mounted optical fibers with corresponding ends of second optical fibers mounted in the same grooves.

7. The process of claim 6 wherein:

a photodetector is mounted above each interface of an end of an optical fiber with an end of a second optical fiber.

8. The process of claim 6 wherein:

the second optical fibers are component parts of a second optical fiber ribbon;

first ends of the second optical fiber ribbon are separated from the ribbon so as to be unconnected from other second optical fibers;

and first ends of the second optical fibers are mounted and bonded in the substrate grooves, whereby the physically connected second ends of the second optical fibers aid in relative orientation of the first ends of the second optical fibers mounted in the grooves of the substrate.

9. The process of claim 8 wherein:

prior to separation of the first ends of the glass fibers from the optical fiber ribbon, the first end of the optical fiber ribbon is placed in a fixture defining an angle α at which the first end of the ribbon is cut, the angle α being substantially less than 90°;

the ribbon is next removed from the fixture;

the first end of the second optical fiber ribbon is next placed in the same fixture and is cut at an angle 180°−α;

and thereafter the first ends of the optical fiber ribbon and of the second optical fiber ribbon are mounted in the support grooves as recited previously.

10. The process of claim 9 wherein:

the fixture comprises a first member having a first beveled surface extending at an angle α from a first bottom surface of the first member and a second member having a second beveled surface extending at an angle 180°−α from a second bottom surface of the second member;

and the step of cutting each ribbon comprises the step of abutting the first and second beveled surfaces against opposite sides of the optical fiber ribbon such that the first and second bottom surfaces of the first and second members are coplanar, and the optical fiber is cut and polished so as to have a surface that is coplanar with the first and second bottom surfaces.

11. A process for making an optical coupler comprising the steps of making a substrate having at least one support groove of a predetermined size in an upper surface; grinding and polishing first ends of first and second optical fibers in the one support groove of the substrate, abutting the first ends of the first and second optical fibers; and bonding the first and second optical fibers to the substrate, wherein the step of making the substrate comprises the steps of:

making at least one preform groove in a glass preform having a refractive index approximately equal to that of the optical fibers, which preform groove is larger than the predetermined size of the one support groove;

heating a portion of the preform to a sufficiently high temperature for reflow thereof;

drawing the reflowed portion of the preform to a sufficiently small diameter that the preform groove therein is of the predetermined size for use as the one support groove;

and cutting part of the drawn portion from the remaining part of the drawn portion so as to define the substrate.

12. The process of claim 11 wherein:

the glass preform has a central axis;

each preform groove is made parallel to the axis;

and the drawn portion is drawn from the glass preform in a direction parallel to the central axis.

13. The process of claim 12 wherein:

the substrate contains a plurality of parallel support grooves;

a first optical fiber ribbon is placed in a fixture defining an angle α substantially less than 90° at which the end of the ribbon is cut, whereafter the first ribbon is removed from the fixture;

a second optical fiber ribbon is placed in the same fixture and one end thereof is cut at an angle of 180°−α, whereafter the second ribbon is removed from the fixture;

a portion of each of the component optical fibers of the first ribbon at the cut end thereof is disconnected from adjacent optical fibers, a portion of each of the component optical fibers of the second ribbon at the cut end thereof is disconnected from adjacent optical fibers;

and the mounting step comprises the step of mounting the disconnected portions of the optical fibers of the first and second ribbons in the support grooves of the substrate.

14. The process of claim 13 wherein:

the fixture comprises a first member having a first beveled surface extending at an angle α from a first bottom surface thereof, and a second member having a second beveled surface extending at an angle 180°−α from a second bottom surface thereof;

the first and second beveled surfaces are abutted against opposite sides of an optical fiber ribbon;

the first and second members are fixed such that the first and second bottom surfaces thereof are coplanar;

and each cutting step comprises the step of cutting and polishing the optical fiber ribbon to form a surface that is coplanar with the first and second bottom surfaces.

15. A process for making an optical fiber device comprising the steps of producing at least one groove in a glass body heating at least a portion of said body to a temperature sufficient to allow reflow, drawing said heated body to reduce the cross section of dimension of said groove producing a grooved substrate and mounting two optical fibers in said groove of said substrate to couple said fibers, wherein said groove in said body before said drawing is substantially larger than said optical fibers, wherein alignment of said two optical fibers is provided by contact at only two tangent lines along the length of the portion of each of said fiber in said groove, wherein said groove is substantially v-shaped in cross section, and wherein said fibers are substantially circular in cross section.

16. The process of claim 15 wherein said glass substrate has a central axis, and the groove before said drawing is made so as to extend in a direction parallel to said axis.

17. The process of claim 16 wherein a plurality of parallel grooves of like size are made in said substrate and are reduced in size upon said drawing and two fibers are mounted in each of said grooves.

18. The process of claim 17 wherein said optical fibers are component parts of an optical fiber ribbon.

* * * * *